(12) United States Patent
Haven

(10) Patent No.: US 11,314,220 B2
(45) Date of Patent: Apr. 26, 2022

(54) NON-CONTACT METHOD AND SYSTEM FOR CONTROLLING AN INDUSTRIAL AUTOMATION MACHINE

(71) Applicant: Liberty Reach Inc., Clearwater, ID (US)

(72) Inventor: G. Neil Haven, Clearwater, ID (US)

(73) Assignee: Liberty Reach Inc., Clearwater, ID (US)

( * ) Notice: Subject to any disclaimer, the term of this patent is extended or adjusted under 35 U.S.C. 154(b) by 76 days.

(21) Appl. No.: 15/963,597

(22) Filed: Apr. 26, 2018

(65) Prior Publication Data

US 2019/0332084 A1   Oct. 31, 2019

(51) Int. Cl.
*G05B 19/402* (2006.01)
*B25J 9/16* (2006.01)

(52) U.S. Cl.
CPC .......... *G05B 19/402* (2013.01); *B25J 9/1697* (2013.01); *G05B 2219/37208* (2013.01); *G05B 2219/40607* (2013.01); *G05B 2219/42249* (2013.01)

(58) Field of Classification Search
CPC ........ G05B 19/402; G05B 2219/42249; G05B 2219/37208
See application file for complete search history.

(56) References Cited

U.S. PATENT DOCUMENTS

| | | | |
|---|---|---|---|
| 3,180,205 A | 4/1965 | Heppe et al. | |
| 4,195,221 A | 3/1980 | Moran | |
| 4,373,804 A | 2/1983 | Pryor et al. | |
| 5,081,530 A | 1/1992 | Medina | |
| 5,852,413 A | 12/1998 | Bacchi et al. | |
| 6,124,589 A | 9/2000 | West | |
| 6,275,742 B1 | 8/2001 | Sagues et al. | |
| 6,278,906 B1 * | 8/2001 | Piepmeier | B25J 9/1607 700/245 |
| 6,621,566 B1 * | 9/2003 | Aldrich | G01N 21/95607 356/237.1 |
| 6,625,517 B1 * | 9/2003 | Bogdanov | B29C 65/02 324/207.21 |
| 6,751,344 B1 | 6/2004 | Grumbine | |
| 6,850,222 B1 * | 2/2005 | Rosenberg | G05G 9/047 345/156 |
| 7,719,224 B2 | 5/2010 | Quan et al. | |
| 8,467,596 B2 * | 6/2013 | Abadpour | G06T 7/12 348/135 |

(Continued)

FOREIGN PATENT DOCUMENTS

WO   1999016010 A1   4/1999

OTHER PUBLICATIONS

Newcombe, Richard A., et al. "KinectFusion: Real-time dense surface mapping and tracking." 2011 10th IEEE International Symposium on Mixed and Augmented Reality. IEEE, 2011. (Year: 2011).*

(Continued)

*Primary Examiner* — Michael D Masinick
(74) *Attorney, Agent, or Firm* — Brooks Kushman P.C.

(57) ABSTRACT

A method and system are provided for controlling an industrial automation machine using non-contact (virtual) position encoding. The system and method can be used to determine the position of an object under assembly on a conveyor system without mechanical coupling to a line or drive mechanism of the line.

23 Claims, 2 Drawing Sheets

(56) References Cited

U.S. PATENT DOCUMENTS

| | | | | |
|---|---|---|---|---|
| 8,493,496 | B2* | 7/2013 | Freedman | G06K 9/2036 |
| | | | | 348/340 |
| 8,971,612 | B2* | 3/2015 | Shotton | G06K 9/6255 |
| | | | | 382/159 |
| 9,193,573 | B1* | 11/2015 | Troy | B66F 7/065 |
| 9,393,695 | B2 | 7/2016 | Scott et al. | |
| 2003/0110003 | A1* | 6/2003 | Topmiller | G01D 5/24452 |
| | | | | 702/150 |
| 2007/0247352 | A1* | 10/2007 | Michael | G01S 13/34 |
| | | | | 342/128 |
| 2012/0306876 | A1* | 12/2012 | Shotton | G06T 17/10 |
| | | | | 345/424 |
| 2013/0329012 | A1 | 12/2013 | Bartos et al. | |
| 2014/0261453 | A1 | 9/2014 | Carlson | |
| 2016/0221187 | A1* | 8/2016 | Bradski | B25J 9/163 |
| 2016/0276970 | A1* | 9/2016 | Hawes | H02P 6/183 |
| 2016/0303741 | A1* | 10/2016 | Scott | B25J 9/1694 |
| 2017/0129101 | A1 | 5/2017 | Sonoda | |
| 2017/0355078 | A1 | 12/2017 | Ur et al. | |
| 2018/0031364 | A1 | 2/2018 | Kallay et al. | |
| 2018/0050452 | A1 | 2/2018 | Ou et al. | |
| 2018/0059219 | A1* | 3/2018 | Irish | G01S 17/003 |

OTHER PUBLICATIONS

Namitha, N., et al. "Point cloud mapping measurements using kinect RGB-D sensor and kinect fusion for visual odometry." Procedia Computer Science 89 (2016): 209-212. (Year: 2016).*

International Searching Authority, The International Search Report and the Written Opinion of the International Searching Authority for International Application No. PCT/US2019/016798 dated Apr. 24, 2019.

The International Bureau of WIPO, International Preliminary Report on Patentability for corresponding International Application No. PCT/US2019/016798, dated Oct. 27, 2020.

European Patent Office, Extended European Search Report for corresponding European Patent Application No. EP19793660.2, dated Feb. 23, 2022.

* cited by examiner

NON-CONTACT METHOD AND SYSTEM FOR CONTROLLING AN INDUSTRIAL AUTOMATION MACHINE

TECHNICAL FIELD

This invention generally relates to control methods and systems in industrial automation systems and, in particular, to non-contact control methods and systems in such industrial automation systems.

OVERVIEW

It is often necessary to "couple" the linear motion of an assembly line or other linear conveyance to the action of a robot or other automated assembly or automated inspection mechanism which must "follow" the motion of an assembly line as an object proceeds along the assembly line. The purpose of this "coupling" or "following" is to maintain a steady relative position between an object traveling along the assembly line and a mechanism which is tasked with inspecting or somehow affecting that object traveling along the assembly line.

This coupling of motions is often achieved by means of mechanical coupling between a linear or rotational position encoder and a cogwheel used to drive an assembly line. Typically, in the current state of the art, a rotary position encoder is attached to a drive shaft or other rotating shaft which is used to create linear motion along a conveyor. As the drive shaft rotates, the rotation of the drive shaft is measured by the rotational encoder, the rotation of the drive shaft is encoded into a train of quadrature pulses which is transmitted electronically to a robot or other device. The quadrature pulses are used to measure linear position; the rate of quadrature pulses is used to measure linear velocity; and so on. The robot or other mechanism interprets these quadrature pulses to derive the position of an object conveyed by the assembly line.

The following U.S. patent documents are related to the present invention: U.S. Pat. Nos. 5,852,413; 6,124,589; 5,850,021; 7,719,224; 8,493,496; 9,393,695; and 2013/0329012; 2014/0261453; and 2018/0031364.

This technology has many limitations as follows:

Inaccurate—due to the backlash in the drive motors, couplings, and conveyor chain assemblies, inaccuracies of several hundred millimeters are common;

Unwieldy—a conveyor segment hundreds of meters long requires an electrical connection hundreds of meters long between the drive shaft's encoder and the robot or other mechanism which is attempting to follow the line;

Decoupled—by its very nature, any relative motion between the conveyor and an object riding on the conveyor cannot be measured by a rotary encoder fixed to a drive shaft. Experience shows that the inertia of heavy objects on an assembly line may drive a heavy object forwards or the object may even bounce backwards when the conveyor's drive motor stops and starts; and Not Scalable—there are few drive shafts in any given conveyor assembly, but there may be many assembly stations requiring following the line.

Devices for the calculation of a limited set of range data from an electronic representation of a visible scene are also well known in the prior art. Typically, these devices employ a 2D sensor and one or more beams of radiation configured so that the beams of radiation intersect an object in the field of view of the 2D sensor, and some radiation from those beams is reflected by that object back to the 2D sensor. The mathematics of triangulation is used to calculate the range to the object for those pixels illuminated by the beam(s) of radiation (see, for example, U.S. Pat. Nos. 3,180,205 and 4,373,804). Using terms of the art: a picture element (designated by its horizontal and vertical coordinates within an imaging array) for which range data is known is termed a volume element or 'voxel.'

Techniques similar to those disclosed in U.S. Pat. Nos. 3,180,205 and 4,373,804 generate a relatively small set of range data. This limitation was overcome by the invention of three-dimensional sensors which produce range data for all, or nearly all, picture elements in their imaging arrays, and hence much more complete range data for objects in their fields of view. See, for example, U.S. Pat. No. 4,195,221, which utilizes time of flight techniques, U.S. Pat. No. 5,081,530 which utilizes scanning beam techniques, or U.S. Pat. No. 6,751,344 which utilizes projected patterns to obtain voxels over an extended field of view. In recent years, the ideas in these early patents have been developed further so that relatively inexpensive consumer-grade 3D sensors are available commercially. For example, a 3D sensor based on the time of flight principle is the DepthSense DS325. A 3D sensor that derives depth from projected structured light is the PrimeSense Carmine. A 3D sensor that utilizes a scanning beam technique is the LMI Gocator.

In view of the above, there is a need for a non-contact, robust method and system that tracks the position of an object as it travels along an assembly line. Such tracking, done properly, can enable assembly and other industrial tasks to be accurately performed on a moving object.

SUMMARY OF EXAMPLE EMBODIMENTS

It is the object of at least one embodiment of the present invention to overcome the above-noted shortcomings of the mechanical encoder method by providing a non-contact, 'virtual' encoder method and system. The virtual encoder method and system uses 3D sensing technology to make continuous, non-contact measurements of an object as it moves along an assembly line. In one embodiment, position and velocity measurements are used to create a train of quadrature signals which are electrically indistinguishable from the train of quadrature signals issued from a standard position encoder. This train of signals may then be fed to a robot or other apparatus configured to accept input from a mechanical position encoder.

In carrying out the above object and other objects of at least one embodiment of the present invention, a non-contact method of controlling an industrial automation machine is provided. The method includes providing at least one 3D or depth sensor at a vision station located in an industrial environment. Each sensor has a field of view at the vision station to obtain a stream of sensor data representative of a surface shape of an inanimate object moving along or about an axis in the vision station within its field of view. The method also includes tracking the pose of the object within the vision station as a function of time based on each stream of sensor data to obtain at least one stream of poses and generating a command signal for use by the industrial automation machine based on at least one stream of poses to control the machine.

The industrial automation machine may be configured to perform a task on the object.

The command signal may be a trigger signal.

The command signal may be a stream of quadrature signals for each axis.

The machine may be an inspection machine to inspect the object.

The machine may be configured to change or affect the object.

Motion of the object may be a linear motion in the vision station.

The step of tracking may include the steps of: processing each stream of sensor data in real time to obtain at least one stream of estimated poses; processing the at least one stream of estimated poses in real time to obtain kinematic state estimates of the object; and processing the kinematic state estimates in real time to obtain an evolution of the state of the object.

The step of processing the kinematic state estimates may utilize a transient model or a steady state model.

Each of the sensors may be mounted in a fixed position within the vision station.

The method may further include determining a multidimensional offset of the object from a reference pose and generating an offset signal for use by the industrial automation machine based on the offset.

Further in carrying out the above object and other objects of at least one embodiment of the present invention, a non-contact system for controlling an industrial automation machine is provided. The system includes at least one 3D or depth sensor. Each sensor has a field of view at a vision station to obtain a stream of sensor data representative of a surface shape of an inanimate object moving along or about an axis in the vision station within its field of view. The system also includes a tracker to track the pose of the object within the vision station as a function of time based on each stream of sensor data to obtain at least one stream of poses and a signal generator to generate a command signal for use by the industrial automation machine based on the at least one stream of poses to control the machine.

The tracker may include at least one programmed processor: to process each stream of sensor data in real time to obtain at least one stream of estimated poses; to process the at least one stream of estimated poses in real time to obtain kinematic state estimates of the object; and to process the kinematic state estimates in real time to obtain an evolution of the state of the object.

The programmed processor may utilize a transient model or a steady state model to process the kinematic state estimates.

DESCRIPTION OF PREFERRED EMBODIMENTS

Figure 1:
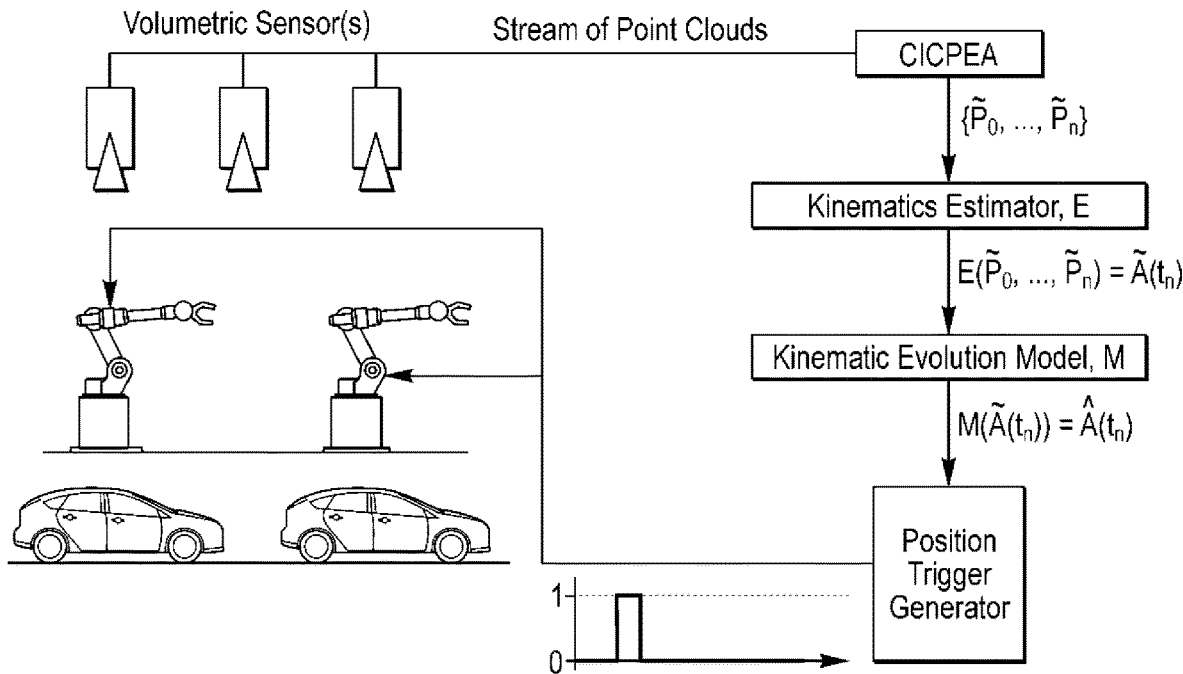
FIG. 1 is a block diagram, schematic view of a system constructed in accordance with at least one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Definitions and Mathematical Systems

"Following the Line"—tracking the pose of an object as it moves along a conveyor "Target Object"—an object moving along a conveyor.

"Effector"—a Tool which changes a Target Object in some way, e.g. a robot.

"Inspector"—a Tool which measures a Target Object, e.g. a Gap and Flush sensor.

"Tool"—an Effector or an Inspector.

The "Virtual Encoder" method and system of the present invention is a method and apparatus to estimate the 6DOF pose of a Target Object as a function of time, then to communicate this information in some usable fashion. The consumer of the information is a Tool, which may be an Effector or an Inspector. The Virtual Encoder is distinguished from a Mechanical Encoder in that the Virtual Encoder is a non-contact device.

The Virtual Encoder method and apparatus is a superior means for determining the position of objects along a conveyor line, compared with present methods using Mechanical Encoders. The Virtual Encoder enables assembly methods which have heretofore not been practical because of the limitations of present methods.

Symbols and Mathematical Definitions $\mathbb{P} = (x,y,z,\alpha,\beta,\gamma)^t$—The pose of a rigid body requires 3 positions+3 rotations $\{\hat{\mathbb{P}}_i, \hat{\dot{\mathbb{P}}}_i, \hat{\ddot{\mathbb{P}}}_i, \ldots\}$—the predicted pose, velocity, acceleration, . . . of an object at time $t_i$ $\{\tilde{\mathbb{P}}_i, \tilde{\dot{\mathbb{P}}}_i, \tilde{\ddot{\mathbb{P}}}_i, \ldots\}$—The measured pose, velocity, acceleration, . . . of an object at time $t_i$ $\mathcal{A}_i = \{\mathbb{P}_i, \dot{\mathbb{P}}_i, \ddot{\mathbb{P}}_i, \ldots\}$—The actual dynamic state of an object $\hat{\mathcal{A}}_i = \{\hat{\mathbb{P}}_i, \hat{\dot{\mathbb{P}}}_i, \hat{\ddot{\mathbb{P}}}_i, \ldots\}$—The predicted dynamic state of an object $\tilde{\mathcal{A}}_i = \{\tilde{\mathbb{P}}_i, \tilde{\dot{\mathbb{P}}}_i, \tilde{\ddot{\mathbb{P}}}_i, \ldots\}$—The measured dynamic state of an object $\mathcal{A}_i^* = \{\mathbb{P}_i^*, \dot{\mathbb{P}}_i^*, \ddot{\mathbb{P}}_i^*, \ldots\}$—The commanded dynamic state of an object $\mathbb{P}(t_n) = \{\mathbb{P}_0, \ldots, \mathbb{P}_n\}$—A (historical) trajectory of an object's pose through time $\mathcal{A}(t_n) = \{\mathcal{A}_0, \ldots, \mathcal{A}_n\}$—The (historical) trajectory of an object's state through time $\hat{\mathcal{A}}(t_n) = \{\hat{\mathcal{A}}_0, \ldots, \hat{\mathcal{A}}_n, \hat{\mathcal{A}}_{n+1}, \hat{\mathcal{A}}_{n+2}, \ldots\}$—The (predicted) evolution of an object's state $\mathfrak{E}(\tilde{\mathbb{P}}_0, \ldots, \tilde{\mathbb{P}}_n) = \tilde{\mathcal{A}}(t_n)$—A kinematic estimator $\tilde{\mathcal{A}}$ estimates the dynamic state of $\mathcal{A}$ $M(\tilde{\mathcal{A}}(t_n)) = (\hat{\mathcal{A}}_n)$—A kinematic model M predicts an object's state's evolution.

The Virtual Encoder method and system typically estimates the pose of a Target Object between ~½ meter and ~5 meters in length in motion at speeds less than ~1000 mm/sec along a linear conveyor.

The Virtual Encoder method and system typically estimates the pose of Target Objects in motion along a one-dimensional axis (the axis of travel of the linear conveyor)

to enable Assembly Operations on the Target Object in motion:

$$\mathbb{P}(t)=(x(t),y,z,\alpha,\beta,\gamma)^t$$

In at least one embodiment, the five steady-state dimensions $\{y,z,\alpha,\beta,\gamma\}$ may be modeled assuming they are fixed in a 'reference' pose. That is: the position and orientation of any point on the Target Object is determined by x(t) and knowledge of the original 'reference' orientation and position of the object, $\mathbb{P}_0=(x_0, y_0, z_0, \alpha_0, \beta_0, \gamma_0)^t$ $$\hat{\mathbb{P}}_{A1}(t)=(\hat{x}(t),0,0,0,0,0)^t+\mathbb{P}_0$$

In at least one embodiment, the five steady-state dimensions may be modeled by assuming they have undergone a rigid transform, $\mathbb{T}$, relative to the 'reference pose'. One embodiment requires a measurement of this rigid transform.

$$\hat{\mathbb{P}}_{A2}(t)=(\hat{x}(t),0,0,0,0,0)^t+\tilde{\mathbb{T}}\cdot\mathbb{P}_0$$

The Virtual Encoder method and system is preferably designed for assembly processes requiring position errors less than ~25 mm: e.g. Paint Application, Badging Inspection, Paint Inspection, Gap and Flush Inspection. This translates to the requirement that $$|\mathbb{P}(t)-\hat{\mathbb{P}}(t)|_{max}\leq 25 \text{ mm}$$

Communication of the object position as a function of time should occur by mimicking a quadrature position encoder signal to take advantage of the pre-existing, low-latency, encoder inputs which are supported by current-generation robot controllers.

The Virtual Encoder system and method operate in two modes. In the first mode one assumes the Target Object is in motion along an assembly line while the Tool is immobile. In the second mode one assumes the Target Object is in motion and the Tool is tracking.

'Trigger' an operation at a desired position, while the Target Object moves along the assembly line. The Tool is immobile. This case can be thought of as taking a 'snap shot' of a Target Object when it reaches a predetermined position. The position (pose) at which an assembly process happens is controlled, but not the velocity.

'Track' the object in motion so that the Target Object is at a relative standstill relative to the Tool. This case can be thought of as working to fool the Tool into thinking the object is stationary. The pose and the velocity at which an assembly process happens are controlled.

Design Specification: Block Diagram of FIG. 1 shows a continuous stream $\{\hat{\mathbb{P}}_0, \ldots, \hat{\mathbb{P}}_n\}$ of pose estimates for a Target Object. The Virtual Encoder method and system emits one or more trigger signal(s) when the Target Object reaches one or more predetermined position(s)—without physically contacting the Target Object.

Figure 2:
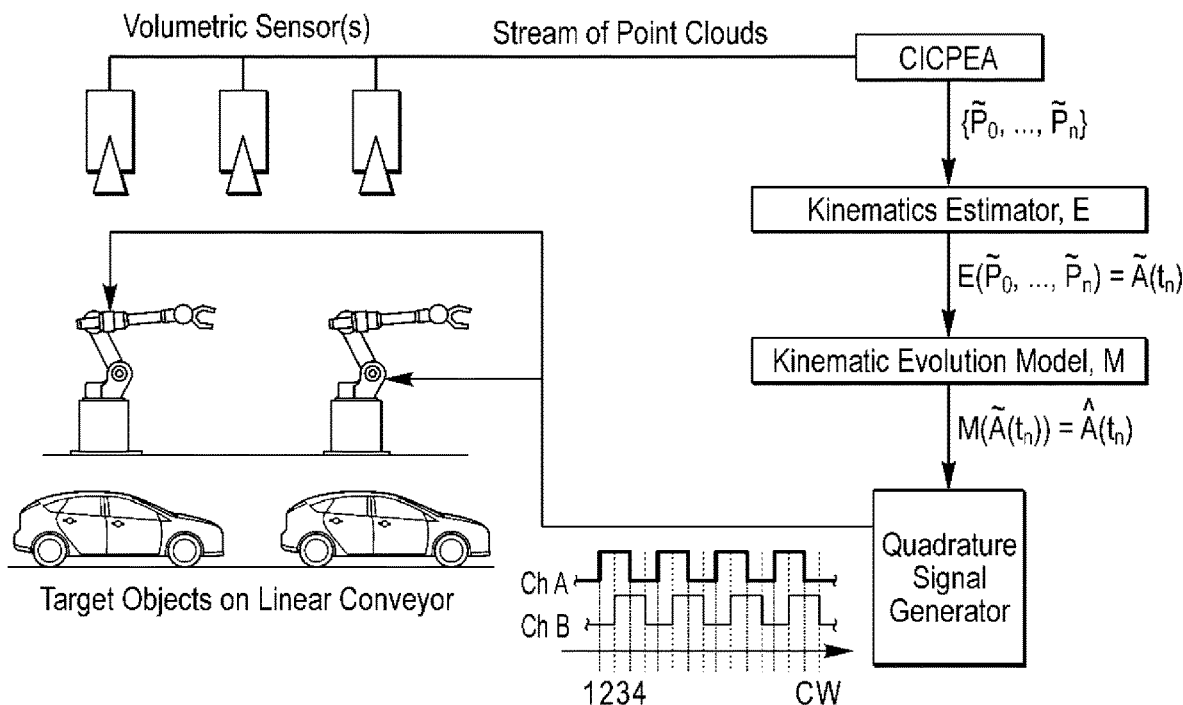
FIG. 2 is a view similar to the view of FIG. 1 except the signal generator is a quadrature signal generator and not a position trigger signal generator.

Design Specification: Block Diagram of FIG. 2 shows a continuous stream $\{\hat{\mathbb{P}}_0, \ldots, \hat{\mathbb{P}}_n\}$ of pose estimates for a Target Object. The Virtual Encoder method and system generates a quadrature signal indicative of the position and velocity of the Target Object—without physically contacting the Target Object.

Design Specification Details

One or more Volumetric Sensors (i.e. 3D sensors) gather 3D data (Point Clouds) from Target Objects in motion through an assembly station. These Volumetric Sensors are mounted in fixed positions at distances between 1 and 4 meters from the Target Object(s). A given assembly station may be monitored by 1 to 4 Volumetric or 3D Sensors.

Calculation of objects' positions as a function of time uses CICPEA technology (Continuously Iterated Cloud-Based Pose Estimation Algorithms). See 'CICPEA' below.

Quadrature signal emulation occurs as described in 'Quadrature Signal Generation' below.

Low-latency and low-jitter signaling (to trigger a Tool and/or to trigger a pose measurement) is important. For example, on a hypothetical assembly line moving at 200 mm/sec, a 50 millisecond trigger delay corresponds to a position error of 10 millimeters.

Volumetric Sensors: Several volumetric sensors are known to the art and available commercially which are capable of producing streams of point clouds indicative of the surface shape of objects in motion within their fields of view. For example: Microsoft Kinect, PrimeSense Carmine, Orbbec Astra, Intel RealSense, etc.

The sensors used to create streams of point clouds for the Virtual Encoder method and system are chosen according to the specific requirements of an application, and may or may not be modified or improved versions of commercially available sensors.

CICPEA Pose Estimation

CICPEA=Continuously Iterated Cloud-Based Pose Estimation Algorithms

Under the assumption that a Target Object is moving 'slowly' compared to the rate of point cloud sampling it is reasonable to estimate that as time evolves, object poses change slowly. Hence, a good estimate for the pose of an object at $t_{n+1}$ is the pose of the object at $t_n$:

$$\hat{\mathbb{P}}_{n+1} \approx \hat{\mathbb{P}}_n \text{ or } \hat{\mathbb{P}}_{n+1} \approx \hat{\mathbb{P}}_n + \tilde{\hat{\mathbb{P}}}_n dt + \tilde{\hat{\mathbb{P}}}_n \frac{dt^2}{2} + \ldots$$

Such approximations can improve the accuracy and speed of algorithms which operate on Point Clouds of data to produce Pose Estimates. Massively parallel geometric processors (such as NVIDIA computing hardware) enable Continuously Iterated Cloud-Based Pose Estimation Algorithms=CICPEA technology. CICPEA technology is used for pose estimation by the Virtual Encoder method and system.

A variety of CICPEA algorithms are known to the art for continuous pose estimation, a prominent example being the KinFu algorithm.

Kinematics Estimator

Several methods are known to the art for producing kinematic state estimates in one dimension from streams of (potentially noisy) pose estimates. In the context of the Virtual Encoder method and system these estimators are termed Kinematics Estimators.

The Kinematics Estimator, $\mathbb{E}$, block of the Virtual Encoder method and system, receives a stream of pose estimates from CICPEA algorithms and produces an estimate of the kinematic state of a Target Object:

$$\mathbb{E}(\hat{\mathbb{P}}_0, \ldots, \hat{\mathbb{P}}_n)=\mathcal{A}(t_n)$$

The kinematics estimator in use for any particular application is configurable by the Virtual Encoder method and system depending on the needs of that installation. Successful Kinematics Estimators used by the Virtual Encoder method and system include: Kalman Filters, a variety of robust estimators for position and velocity, linear least squares fit for position and velocity, and so on. Other appropriate methods will suggest themselves to persons versed in the art.

Kinematics Model: Given a historical state estimate from a Kinematics Estimator, the task of the Kinematics Model is to predict the evolution of the state of the Target Object. Any number of Kinematics Models will suggest themselves to persons versed in the art, but a favored method for the Virtual Encoder is the following:

For each new state estimate in the sequence $\{\mathcal{A}_0, \ldots, \mathcal{A}_n\}$ extract the position and velocity estimates from the final two (most recent) state estimates $\{\tilde{x}_{n-1}, \dot{\tilde{x}}_{n-1}, \tilde{x}_n, \dot{\tilde{x}}_n\}$;

Calculate the sample frequency $\lambda = t_n - t_{n-1}$;

Set the steady-state velocity to the most recent velocity estimate $v_\infty = \dot{\tilde{x}}_n$ and set a 'slow velocity' threshold $v_{slow}$ to $6\sigma_v$ where $\sigma_v$ is the conveyor velocity uncertainty;

If $v_\infty \leq v_{slow}$ calculate a $1^{st}$-order (position/velocity) 'transient' model: $M^T = M_1^T(t_n + dt)$: $x(dt) = x + \dot{x}dt$;

else calculate a $3^{rd}$-order (position/velocity/acceleration/jerk) 'transient' model:

$$M^T = M_3^T(t_n + dt): x(dt) = x + \dot{x}dt + \ddot{x}\frac{dt^2}{2} + \dddot{x}\frac{dt^3}{6};$$

Calculate the evolution of the state of the Target Object anew as follows:

For $t < t_n + \lambda$ use the transient model to calculate $M^T(t)$: $x(t_n + \lambda - t)$;

For $t \geq t_n + \lambda$ use the 'steady state' model: $M^S(t)$: $x(t - (t_n + \lambda)) = \tilde{x}_n + v_\infty dt$;

Transient Models:

If $v_\infty \leq v_{slow}$ the $1^{st}$-order (position/velocity) transient model is calculated as follows $$M^T = M_1^T(t_n + dt): x(dt) = \tilde{x}_{n-1} + \frac{\tilde{x}_{n-1} - \tilde{x}_{n-1}}{\lambda}dt$$

Else if $v_\infty > v_{slow}$ the $3^d$-order (position/velocity/acceleration/jerk) transient kinematic model is calculated by solving the following equations $$x(dt) = x + \dot{x}dt + \ddot{x}\frac{dt^2}{2} + \dddot{x}\frac{dt^3}{6}$$

$$x(0) = \tilde{x}_{n-1}; x(\lambda) = \tilde{x}_n$$

$$\dot{x}(0) = \dot{\tilde{x}}_{n-1}; \dot{x}(\lambda) = \dot{\tilde{x}}_n$$

Which yields:

$$M^T = M_3^T(t_n + dt): x(dt) = x_0 + v_0 dt + a\frac{dt^2}{2} + j\frac{dt^3}{6}, \text{ where}$$

$$x_0 = \tilde{x}_{n-1}; x_1 = \tilde{x}_n; v_0 = \dot{\tilde{x}}_{n-1}; v_1 = \dot{\tilde{x}}_n$$

$$j = \frac{(x_1 - x_0 - v_0\lambda) - \frac{(v_1 - v_0)\lambda}{2}}{-\frac{\lambda^3}{12}}$$

$$a = \frac{(x_1 - x_0 - v_0\lambda) - j\lambda^3/6}{\lambda^2/2}$$

Position Trigger Generator: Given a sequence of trigger positions $\{q_0, \ldots, q_k\}$ at which an assembly operation for a Target Object should be triggered:

Each time the Kinematics Model is updated, calculate the predicted 'trigger times' $\{t_0, \ldots, t_k\}$ for these assembly operations via:

$$x(t_0 + \epsilon) = q_0$$
$$\vdots$$
$$x(t_k + \epsilon) = q_k$$

where $\epsilon$ is the signal latency for the assembly operation signal transmission.

When a trigger time is reached, signal the trigger for that event and remove the trigger from the list of trigger positions for that Target Object.

Quadrature Signal Generator: The task of the Quadrature Signal Generator is to create a stream of output quadrature signals to emulate the position evolution of the Target Object. Each time a new state estimate is available the Quadrature Signal Generator must be reinitialized.

The time-resolution of the quadrature signal generating circuitry $\epsilon_g$ and the time-resolution of the quadrature signal receiving circuitry $\epsilon_r$ should be predetermined. The rate of production of output signals is limited by $dt = 4*\max\{\epsilon_g, \epsilon_r\}$. Pseudo-code for a quadrature signal is as follows:

```
Begin Quadrature Signal Generator        while (t ≥ t_n + λ){
x = x_0                                      x* = integer(M^S(t))
t = t_n                                      if (x* ≠ x) {
dt = 4*max (ε_g, ε_r)                           SendQuadraturePulse (x*-x)
λ = t_n - t_{n-1}                                x = x*
while (t < t_n + λ){                         }
    x* = integer(M^T(t))                     t += dt
    if (x* ≠ x) {                         }
        SendQuadraturePulse (x*-x)     End QuadratureSignalGenerator
        x = x*
    }
    t += dt
}
```

Quadrature Signal Generation: The signal generation of a Mechanical Rotary Encoder is driven by the rotation of a wheel. The Virtual Encoder emulates a quadrature signal in response to the stream of Target Object pose measurements 'as-if' a mechanical encoder was measuring the position of the Target Object.

Figure 3A:
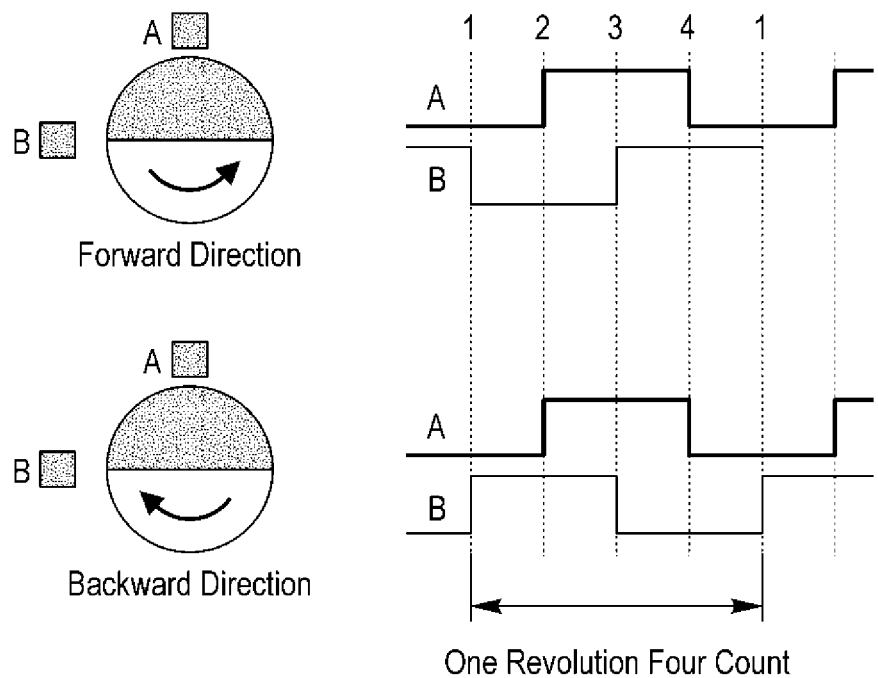
FIGS. 3a and 3b are schematic diagrams illustrating the generation of quadrature signals.
Figure 3B:
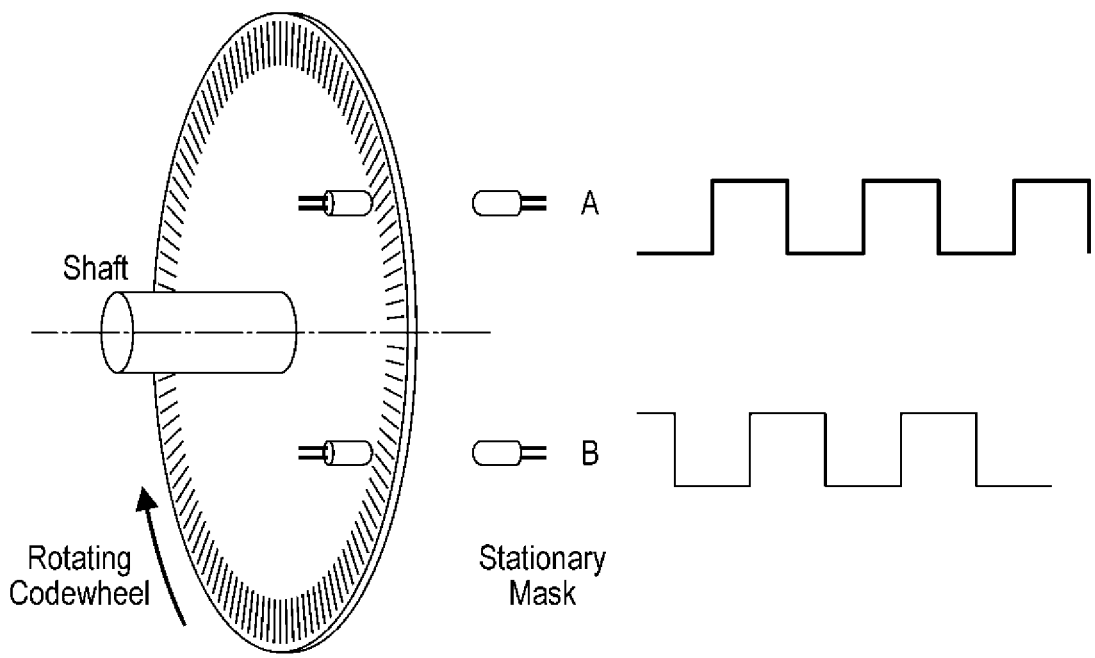

A quadrature encoder signal is a two-channel binary signal which indicates both the direction and rate of change of an object's position. The rate of change is indicated by the rate at which HIGH-LOW transitions occur. The direction is indicated by the relative phase of the A and B channels as illustrated in FIGS. 3a and 3b. Pseudo-code for a quadrative pulse is as follows:

```
Subroutine Send Quadrature Pulse        else {
Parameter Integer dx*                       digital Output (1, true)
    if (dx* > 0) {                          wait (λ)
        digital Output (A, true)            digital Output (0, true)
        wait (λ)                            wait (λ)
        digital Output (B, true)            digital Output (1, false)
        wait (λ)                            wait (λ)
        digital Output (A, false)           digital Output (0, false)
            wait (λ)                        wait (λ)
        digital Output (B, false)       }
        wait (λ)                    End Subroutine Send Quadrature
                                    Pulse
}
```

The advantages of the above-noted method and system are numerous including but not limited to:
1. The Virtual Encoder method and system achieve much greater accuracies than the mechanical encoder method;
2. The apparatus of the virtual encoder method (3D sensors and computational hardware necessary to run algorithms for tracking the linear motion of an object) may be installed nearby the assembly station where the information is needed. Thus, there is no problem with installing multiple such stations along the same segment of an assembly line;
3. The Virtual Encoder system is not mechanically coupled to the conveyor line, so it has none of the robustness problems of the mechanical encoder; and
4. Since the 'virtual' encoder method and system are implemented via computer algorithms, the virtual encoder is also a 'smart' encoder, and may implement a variety of advanced signal filtering methods (such as Kalman filtering) which are well-known to improve the performance of position prediction methods in the presence of noise, but which are unavailable to purely mechanical encoders.

The pose of an object can be estimated using a sensor capable of measuring range (depth) data. Location of the object relative to the sensor can be determined from one or more range measurements. Orientation of the object can be determined if the sensor provides multiple range measurements for points on the object. Preferably a dense cloud of range measurements is provided by the sensor so that orientation of the object can be determined accurately.

Use of at least one embodiment of the present invention improves accuracy and robustness of position encoding along a conveyor system, and, consequently, enables manufacturing techniques which heretofore have not been possible or have not been not economically feasible. Examples of such practices and techniques are:
1. Accurately following contours of a known object being painted, scanned, or otherwise coated when the contours of the object are already known, hence improving efficiency of painting operations;
2. Allowing inspections to be performed at accurate locations on a vehicle while in motion, for example: measuring body panel gap and flush, making ultrasonic measurements for leaks around windows.
3. When coupled with a separate system for measuring the contours of an unknown system, allows to follow the contours of an unknown object being painted, scanned or otherwise coated, hence improving efficiency of such operations.

In one preferred embodiment, the system includes one or more volumetric or 3D sensors configured to observe an object as it traverses an assembly or inspection station. The point cloud data from these sensors is fed to a computer, which implements algorithms for tracking the 1D motion of an object. The position and velocity estimates from these tracking algorithms may be fed through linear or non-linear filtering means such as Kalman filters, model-predictive algorithms, or other filters known to the art for improving position estimations. The result is translated to a time series of quadrature signals by electronic means. The quadrature signal train is fed to a robot or other device configured to use such a signal train for tracking the linear motion of an object.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-contact method of controlling an industrial automation machine configured to accept input from a mechanical position encoder to perform an industrial task on an inanimate object moving on a conveyor, the method comprising:
   providing at least one 3D or depth sensor at a vision station located in an industrial environment, each sensor having a field of view at the vision station to obtain a stream of point cloud data representative of a surface shape of the object moving along or about an axis in the vision station within its field of view wherein the step of providing provides continuous, non-contact, position and velocity measurements of the moving object;
   real time tracking the motion of the object within the vision station based on each stream of point cloud data utilizing a continuously iterated, cloud-based, pose estimation algorithm to process each stream of point cloud data in real time to obtain at least one continuous stream of estimated poses, wherein the step of tracking includes the step of processing the at least one continuation stream of estimated poses in real time to obtain kinematic state estimates of the object and processing the kinematic state estimates in real time to obtain an evolution of the state of the object; and
   providing a signal generator configured to be in direct communication with the industrial automation machine to generate a stream of command signals based on the evolution of the state of the object to control the machine via low-latency signaling so that the machine accurately performs the industrial task at at least one accurate location on the moving object wherein the stream of command signals are indicative of the position and velocity of the moving object and are based on the continuous, non-contact position and velocity measurements of the moving object.

2. The method as claimed in claim 1, wherein the industrial automation machine is an industrial robot.

3. The method as claimed in claim 1, wherein at least one of the command signals is a trigger signal.

4. The method as claimed in claim 1, wherein at least one of the command signals is a stream of quadrature signals for each axis.

5. The method claimed in claim 2, wherein the machine is an inspection machine to inspect the object.

6. The method as claimed in claim 2, wherein the industrial task includes one of an assembly task, an inspection task, a painting task, a scanning task and a coating task.

7. The method as claimed in claim 1, wherein the conveyor is a linear conveyor.

8. The method as claimed in claim 1 further comprising determining a multidimensional offset of the object from a reference pose and generating an offset signal for use by the industrial automation machine based on the offset.

9. The method as claimed in claim 1, wherein the step of processing the kinematic state estimates utilizes a transient model.

10. The method as claimed in claim 1, wherein the step of processing the kinematic state estimate utilizes a steady state model.

11. The method claims in claim 1, wherein a plurality of 3D or depth sensors are provided and wherein each of the sensors is mounted in a fixed position within the vision station.

12. A non-contact system for controlling an industrial automation machine configured to accept input from a mechanical position encoder to perform an industrial task on an inanimate object moving on a conveyor, the system comprising:

at least one 3D or depth sensor, each sensor having a field of view at a vision station to obtain a stream of point cloud data representative of a surface shape of the object moving along or about an axis in the vision station within its field of view wherein the at least one 3D or depth sensor provides continuous, non-contact, position and velocity measurements of the moving object;

a tracker to track the motion of the object within the vision station as a function of time based on each stream of point cloud data utilizing a continuously iterated, cloud-based, pose estimation algorithm to obtain at least one continuous stream of estimated poses, a kinematic estimator to process each stream of estimated poses in real time to obtain kinematic state estimates of the object and a kinematic evolution model to process the kinetic state estimates in reals time to obtain an evolution of the state of the object; and a signal generator configured to be in direct communication with the industrial automation machine to generate a stream of command signals based on the evolution of the state of the object to control the machine via low-latency signaling so that the machine accurately performs the industrial task at at least accurate location on the moving object wherein the stream of command signals are indicative of the position and velocity of the moving object and are based on the continuous, non-contact position and velocity measurements of the moving object.

13. The system as claimed in claim 12, wherein the industrial automation machine is an industrial robot.

14. The system as claimed in claim 12, wherein at least one of the command signals is a trigger signal.

15. The system as claimed in claim 12, wherein at least one of the command signals is a stream of quadrature signals for each axis.

16. The system claimed in claim 13, wherein the machine is an inspection machine to inspect the object.

17. The system as claimed in claim 13, wherein the industrial task includes one of an assembly task, an inspection task, a painting task, a scanning task and a coating task.

18. The system as claimed in claim 12, wherein the conveyor is a linear conveyor.

19. The system as claimed in claim 12, wherein the tracker includes at least one processor programmed with the pose estimation algorithm, the kinematic estimator and the kinematic evolution model.

20. The system as claimed in claim 19, wherein the programmed processor utilizes a transient model to process the kinematic state estimates.

21. The system as claimed in claim 19, wherein the programed processor utilizes a steady state model to process the kinematic state estimates.

22. The system claims in claim 12, wherein the system includes a plurality of 3D or depth sensors and wherein each of the sensors is mounted in a fixed position within the vision station.

23. The system as claimed in claim 12 further comprising means for determining a multidimensional offset of the object from a reference pose and a signal generator to generate an offset signal for use by the industrial automation machine based on the offset.

* * * * *